United States Patent
Nomoto

Patent Number: 5,789,059
Date of Patent: Aug. 4, 1998

[54] HONEYCOMB CORE

[75] Inventor: Kazuhiko Nomoto, Tokyo, Japan

[73] Assignee: Showa Aircraft Industry Co., Ltd., Tokyo, Japan

[21] Appl. No.: 431,118

[22] Filed: Apr. 28, 1995

[51] Int. Cl.$^6$ ............................................. B32B 3/12
[52] U.S. Cl. ...................... 428/116; 52/793.1; 493/966
[58] Field of Search ............................ 428/116, 118; 52/793.1; 493/966

[56] References Cited

U.S. PATENT DOCUMENTS

| | | | |
|---|---|---|---|
| 3,013,584 | 12/1961 | Reed et al. | 428/116 X |
| 4,118,263 | 10/1978 | Cook, Jr. | 428/116 X |
| 4,235,950 | 11/1980 | Miedaner | 428/36.4 |
| 4,529,640 | 7/1985 | Brown et al. | 428/116 |
| 4,729,921 | 3/1988 | Tokarsky | 428/323 X |
| 4,836,507 | 6/1989 | Yang | 428/116 X |
| 5,094,913 | 3/1992 | Yang | 428/373 X |
| 5,137,768 | 8/1992 | Lin | 428/118 X |

*Primary Examiner*—Henry F. Epstein
*Attorney, Agent, or Firm*—Flynn, Thiel, Boutell & Tanis, P.C.

[57] ABSTRACT

A honeycomb core or honeycomb structure 1 is made up of an arrangement of hollow cylindrical cells individually separated by cell walls made of base sheets 4. Each base sheet is a complex mixture of para-aramid fibers 2 and meta-aramid pulp material. The para-aramid fibers 2 occupy a weight percentage of from not less than 20% to less than 50% The honeycomb core is made by either the expanding method of the steps of stacking a plurality of base sheets 4, applying stripes of adhesive and then extending the stack or by the corrugating method of the steps of corrugating respective base sheets, stacking and bonding the corrugated sheets. If desired, after-treatment for reinforcement may be executed to apply or impregnating phenolic resin or other impregnating agent.

6 Claims, 4 Drawing Sheets

HONEYCOMB CORE

BACKGROUND OF THE INVENTION

1. Field of the Inventions

The present invention relates to a honeycomb core or honeycomb structure using aramid fibers as a material of its base sheets.

2. Description of the Prior Art

Base sheets used in conventional honeycomb structures to form cell walls for separating individual cells are made by processing a nonwoven material of aramid fibers into sheets. That is, a mixture mainly including-short-cut meta-aramid fibers are made into sheets, and these sheets are used as base sheets of these conventional honeycomb structures. One of the typical methods of making these base sheets into a honeycomb structure comprises applying adhesive stripes onto surfaces of the base sheets, stacking and bonding them together, and pulling them to expand the distances between their non-bonded faces. Another method comprises deforming the base sheets into corrugated forms, stacking and bonding them together with bottoms of the corrugation of one sheet joining with tops of the corrugation of another sheet. By either method, base sheets are made to behave as cell walls for separating individual cells, and an arrangement of these individual cells makes a honeycomb structure.

These conventional honeycomb structures, however, involve some problems discussed below.

Meta-aramid fibers used to make up the base sheets have a relatively low Young's modulus of elasticity. Due to this, conventional honeycomb structures were often weak and unacceptable for use as a base material that must be sufficiently strong.

In such cases, relatively weak honeycomb structures were conventionally reinforced by impregnation or coating using a significant amount of an impregnating agent, such as a phenolic resin or the like, having a high Young's modulus of elasticity, and desired high strengths were realized by increasing the amount of impregnating or coating agents. Due to this, such conventional honeycomb structures were too heavy, and their strength-to-weight ratios were lower than acceptable values required for honeycomb structures in general.

OBJECT OF THE INVENTION

It is therefore an object of the present invention to provide a honeycomb core with ma high strength.

A further object of the invention is to provide a light-weight honeycomb core having an excellent strength-to-weight ratio.

A still further object of the invention is to provide a honeycomb core that is easy and inexpensive to manufacture.

SUMMARY OF THE INVENTION

According to the invention, there is provided a honeycomb core comprising an arrangement of hollow cylindrical cells individually separated by cell walls formed by base sheets which are made of a mixture of para-aramid fibers and meta-aramid pulp material. The para-aramid fibers occupy a weight percentage of not less than 20% to less than 50% of the mixture.

Preferably, the para-aramid fibers are cut into short fibers, and mixed with meta-aramid pulp material which is also cut into fine chips.

If the para-aramid content is less than 20%, the strength of the base sheet will not reach a required value. If it is 50% or more, the elasticity of the base sheet will decrease below a required value.

Since the para-aramid fibers exhibit a high elastic modulus, it inherently increases the strength of the honeycomb core and does not require additional reinforcement by coating or impregnation by a large amount of an impregnating agent. This means that finished honeycomb cores are light in weight and have excellent strength-to-weight ratios. The meta-aramid pulp material behaves as a binder and makes the paper-making process easier. The use of an appropriate amount of the meta-aramid pulp material also contributes to minimizing the amount of expensive para-aramid fibers which would otherwise increase the production cost of the honeycomb core unacceptably.

The foregoing and other objects, features and advantages of the invention become more apparent in light of the following description of preferred embodiments thereof, as illustrated in the accompanying drawings.

DESCRIPTION OF THE PREFERRED EMBODIMENTS

Figure 1A:
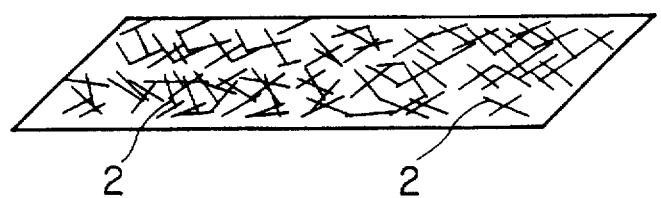
FIGS. 1A to 1C are perspective views of a honeycomb core embodying the invention, with FIG. 1A showing a sheet just after a paper-making process, FIG. 1B showing a process of making a base sheet, and FIG. 1C showing a process of applying stripes of adhesive onto the base sheet.
Figure 1B:
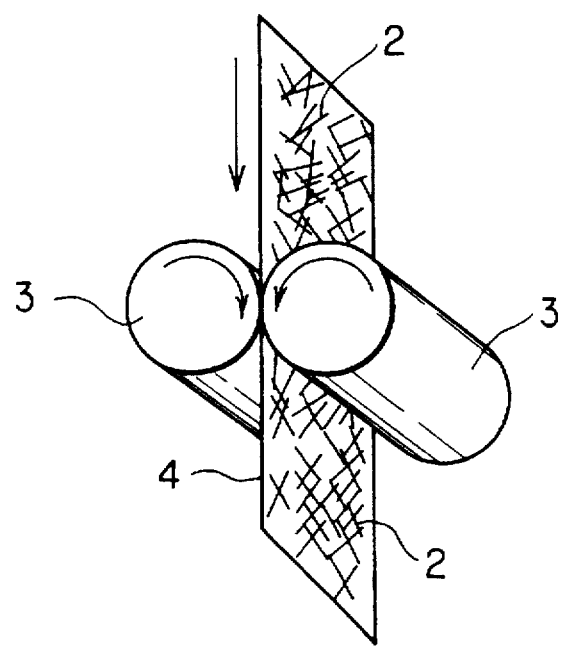

The invention is described below in detail, taking an embodiment illustrated in different steps of a manufacturing process in the drawings.

Para-aramid fibers 2 are used as aramid fibers, a sort of nylon fibers. The para-aramid fibers 2 used as a major component are mixed with meta-aramid pulp material (now shown) and one or more other components, and are made into a sheet material as shown in FIG. 1A by a paper-making process. Apparently, the para-aramid fibers 2 used here are prepared into short fibers in a preceding chopping process using a cutter. Also, the meta-aramid pulp material is used after being cut into fine chips, and further processed in a solution of sulfuric acid or other chemical bath into curled threads which easily intertwine and interconnect. The amount of para-aramid fibers 2 is chosen appropriately from values of not less than 20 to less than 50 weight percent of the mixture.

The sheet material shown in FIG. 1A is subsequently fed in between heat rolls 3 for applying heat and pressure to the sheet material. Thus, the sheet material is extruded from the heat rolls 3 in the form of a base sheet 4 having complete flatness and integrity. If the para-aramid fibers 2 and the meta-aramid pump material are still insufficiently bound together in the base sheet 4 or if the surface of the base sheet 4 exhibits any unevenness, a polymeric binder substance, such as a phenolic resin, in the range of 5 to 30 weight percent of the base sheet may be added prior to making the sheet material of FIG. 1A. Since the phenolic resin is inexpensive, its use gives another advantage that the entire material cost of the honeycomb core decreases.

Figure 1C:
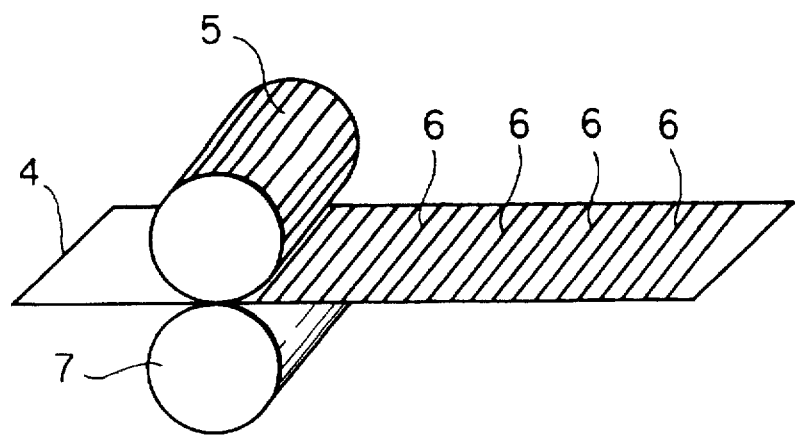

After that, as shown in FIG. 1C, stripes of adhesive 6 are applied onto a surface of the base sheet 4 by using an adhesive applying roll 5. Numeral 7 denotes a back-up roll. After the stripes of adhesive 6 are dried, a plurality of such base sheets 4 are stacked, one over another, such that the pitch of the stripes 6 on one base sheet is offset by half the pitch from the stripes 6 on another base sheet. The stack of base sheets 4 is then heated and pressed, so that the stripes of adhesive 6 melt and then set to firmly bind the sheets 4 together. Subsequently, the stack of the base sheets 4 is cut into segments of a desired size along a line parallel to the stripes of adhesive 6.

Each segmental stack of the base sheets 4 is then extended in its stacking direction so as to expand distances between non-bonded opposite faces of respective base sheets 4. Thus, the honeycomb core 1 having an arrangement of a number of cells is obtained.

Instead of the aforementioned extending method, individual base sheets 4 may be corrugated by using a gear or a rack, and a plurality of such corrugated sheets 4 may be stacked and bonded together, with troughs of one sheet 4 joining with peaks of another sheet 4, to form a similar configuration of the honeycomb core 1.

Figure 2A:
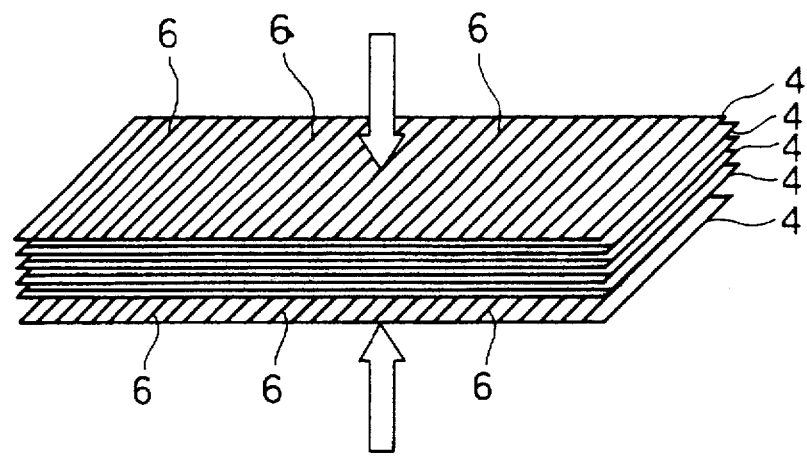
FIGS. 2A to 2C are perspective views of a stack of the base sheets, with FIG. 2A showing a process of stacking and bonding a plurality of the sheets of FIGS. 1A to 1C by applying heat and pressure, FIG. 2B showing a process of cutting the stack of the base sheets into segments, and FIG. 2C showing a process of expanding distances between the respective base sheets in a segmental stack of the base sheets into a honeycomb structure.
Figure 2B:
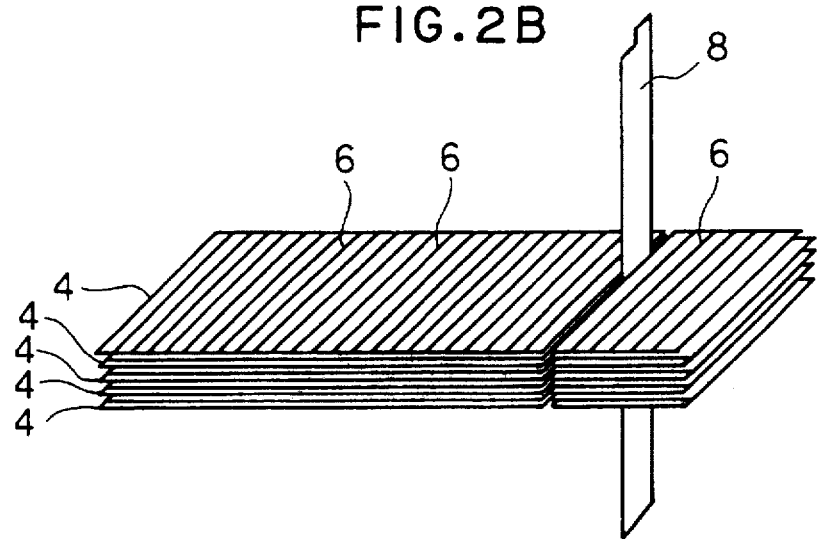
Figure 2C:
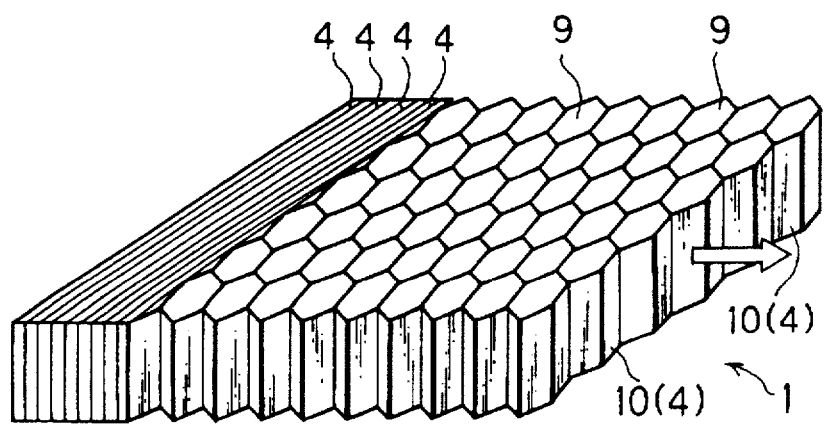

The honeycomb core 1, made by the foregoing steps, defines an arrangement of a number of hollow cylindrical cells 9 which are individually separated by cell walls 10 made by the base sheets 4, as shown in FIG. 2C.

Although the honeycomb core 1 already has a sufficient strength and an excellent strength-to-weight ratio because of the para-aramid fibers 2 used to make its base sheets 4, additional treatment may be applied to the honeycomb core 1 if a higher strength is desired.

Figure 3A:
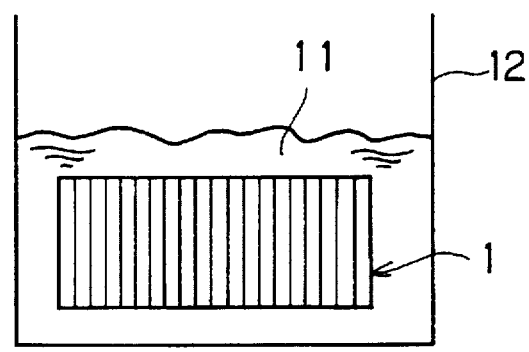
FIGS. 3A and 3B are views showing optional processing of the honeycomb core, with FIG. 3A showing a step of immersing the honeycomb structure into an impregnating solution, and FIG. 3B showing a process of drying and setting the impregnated honeycomb structure.
Figure 3B:
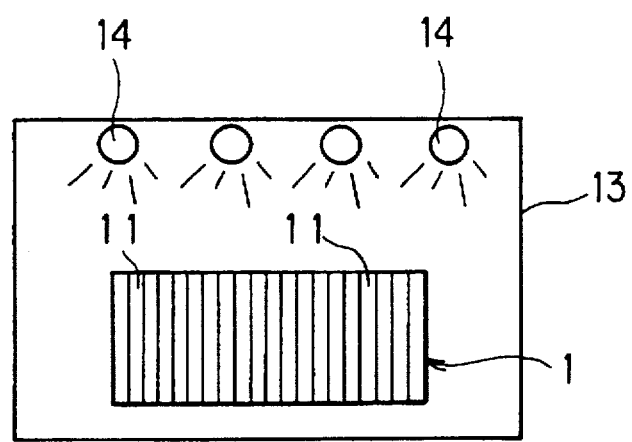

FIGS. 3A and 3B show such additional treatment for reinforcement. As shown in FIG. 3A, the honeycomb core 1 is immersed in a bath 12 containing a solution of an impregnating agent 12 which may comprise a polymeric binder substance, such as a phenolic resin, having a high Young's modulus of elasticity. Then, the honeycomb core 1, impregnated or coated by the impregnating agent 11, is extracted from the bath 12, and sent to a processing chamber 13 for drying and heating treatments using a heat source 14. Thus, the impregnating agent 11 is thermally set, coating the cell walls 10. The coating or impregnating process may be repeated until the weight and strength of a particular honeycomb core 1 reach specific values desired for the honeycomb core 1.

By using an appropriate amount of para-aramid fibers 2, namely, from 20% to less than 50% in weight of the mixture, in conjunction with an appropriate amount of meta-aramid fibers to make the base sheets, the intended advantages of the invention are totally attained as summarized below.

First, because of the para-aramid fibers having a higher Young's modulus of elasticity than that of meta-aramid fibers, the cell walls 10 and the honeycomb core 1 have a higher strength than conventional honeycomb structures. If the weight percentage of the para-aramid fibers 2 is less than 20%, the strength of the honeycomb core 1, such as compressive strength, would be insufficient. If it is 50% or more, the structure would become stiff and lose toughness.

Second, since the honeycomb core 1 with an appropriate amount of para-aramid fibers is inherently strong as stated above, it basically needs no aftertreatment for reinforcement by impregnation. Even if any impregnating agent 11 is still used, its amount can be significantly reduced as compared with conventional structures. Therefore, the honeycomb core 1 according to the invention is very light, and has an excellent strength-to-weight ratio.

Third, the use of para-aramid fibers of a weight percentage less than 50% in conjunction with an appropriate amount of meta-aramid pulp material not only makes the paper-making process easy but also provides a reasonable manufacturing cost which would otherwise become unacceptably high if an excessive amount of expensive para-aramid fibers is used.

Figure 4:
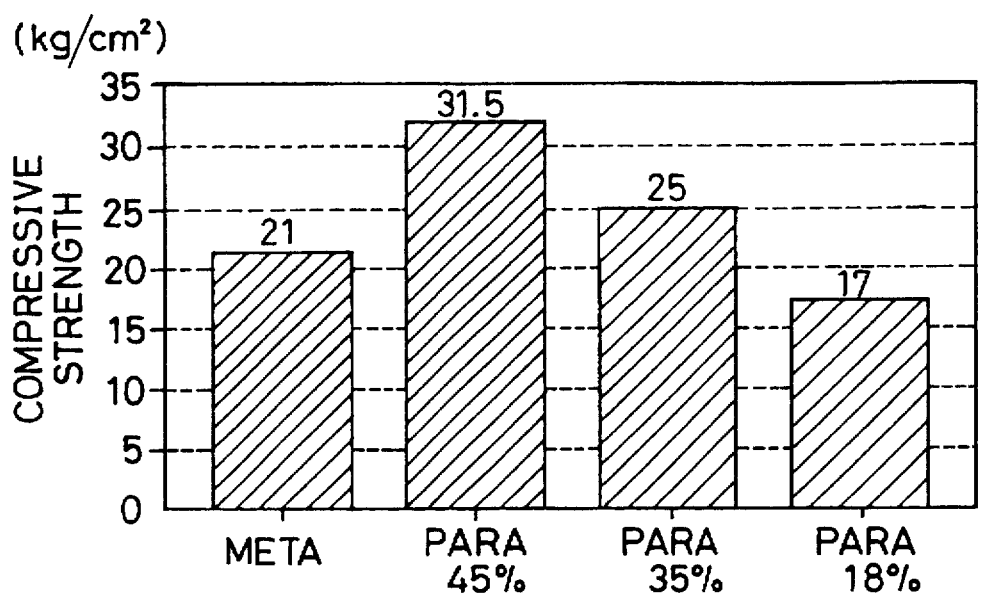
FIG. 4 is a graph showing an experimental result of compressive strengths of some comparative structures and of honeycomb structures according to embodiments of the invention.
Figure 5:
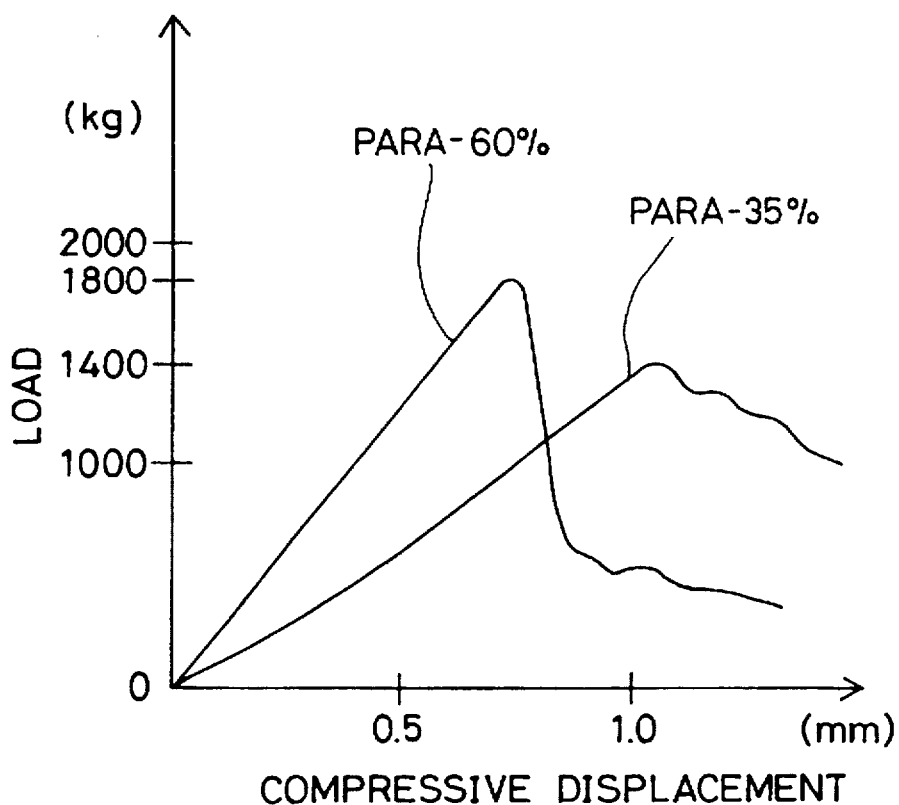
FIG. 5 is a graph showing a load curve, in terms of compressive displacement with load, obtained by a compressive breakdown test of an inventive honeycomb structure and another honeycomb structure by using a universal testing machine.

FIGS. 4 and 5 show experimental results regarding the strength of the honeycomb core according to the invention, referred to above as the first advantage. Used in these tests is a square honeycomb core with each side 76 mm (about 3 inches) long, 20 mm thick, and weighing 48 kg/m$^3$ (about 3 pounds/cubic feet), in which each cell is 3 mm (about ⅛ inch) large.

Used in the compressive strength test of FIG. 4 are (1) a honeycomb structure comprising a mixture of meta-aramid fibers and a phenolic resin (labelled META in the drawing); (2) a honeycomb core according to an embodiment of the invention, comprising a mixture of 45 weight percent of para-aramid fibers 2, 35 weight percent of meta-aramid pulp material and 20 weight percent of a phenolic resin (labelled PARA-45% in the drawing); (3) a honeycomb core according to another embodiment of the invention, comprising a mixture of 35 weight percent of para-aramid fibers 2, 45 weight percent of meta-aramid pulp material, and 20 weight percent of phenolic resin (labelled PARA-35% in the drawing); and (4) a honeycomb core departing from the invention, comprising a mixture of 18 weight percent of para-aramid fibers 2, 62 weight percent of meta-aramid fibers, and 20 weight percent of phenolic resin (labelled PARA-18% in the drawing).

The graph of FIG. 4 shows that the PARA-45% structure of (2) and the PARA-35% structure of (3) have compressive strengths above that of the META structure of (1) but the PARA-18% structure of (4) has a compressive strength below that of the META structure of (1). It is therefore apparent from the result of the test that 20 weight percent is the lower limit of para-aramid fibers 2 to attain the objects of the invention.

Used in the compressive breakdown test of FIG. 5 are the PARA-35% structure according to one of the embodiments of the invention shown at (3) in FIG. 4, comprising a mixture of 35 weight percent of para-aramid fibers 2, 45 weight percent of meta-aramid pulp material and 20 weight percent of phenolic resin; and a honeycomb structure departing from the invention, comprising 60 weight percent of para-aramid fibers 2, 20 weight percent of meta-aramid pulp material and 20 weight percent of phenolic resin (labelled PARA-60% in the drawing).

The graph of FIG. 5 shows that the PARA-35% structure begins to break down with a maximum load of about 1,400 kg but the breakage progresses only gradually and slowly, which shows the high toughness of the PARA-35% structure. In contrast, the PARA-60% departing from the invention rapidly breaks down after breakage starts at a maximum load of about 1,800 kg, which shows the unacceptable stiffness and liability to destruction of the PARA-60% structure. This tendency noticeably appears when para-aramid fibers 2 exceeds 50 weight percent. It is therefore apparent that 50 weight percent should be the upper limit of para-aramid fibers 2 in the honeycomb core 1 to attain the objects of the invention.

Although the invention has been shown and described with respect to preferred embodiments thereof, it should be understood by those skilled in the art that the foregoing and other changes and omissions in the form and detail thereof may be made therein without departing from the spirit and scope of the invention.

What is claimed is:

1. A honeycomb core comprising an arrangement of hollow cylindrical cells individually separated by cell walls formed by base sheets, each base sheet being a mixture comprising para-aramid fibers and meta-aramid pulp material, said para-aramid fibers occupying a weight percentage of from not less than 20% to less than 50% of the mixture.

2. The honeycomb core according to claim 1 wherein said cell walls are reinforced by a phenolic resin or another polymeric binder material applied to surfaces of or impregnated into said cell walls.

3. The honeycomb core according to claim 1, wherein each base sheet is formed from a heat and pressure treated sheet of a mixture of chopped para-aramid fibers as a major component and chemically treated meta-aramid pulp material in the form of threads as a binder.

4. The honeycomb core according to claim 1, wherein a phenolic resin is present in a weight percentage of from 5% to 30%.

5. A honeycomb core comprising an arrangement of hollow cylindrical cells individually separated by cell walls formed by base sheets, each base sheet being a mixture comprising para-aramid fibers, meta-aramid pulp material and a phenolic resin or another polymeric binder material, said para-aramid fibers occupying a weight percentage of from not less than 20% to less than 50% and said phenolic resin or another polymeric binder material is present in a weight percentage of from 5% to 30%, said weight percentage being based on the weight of the mixture.

6. The honeycomb core according to claim 5, wherein the phenolic resin is present in a weight percentage of from 5% to 20%.

* * * * *